US012333861B2

(12) United States Patent
Luo et al.

(10) Patent No.: US 12,333,861 B2
(45) Date of Patent: Jun. 17, 2025

(54) COMPUTING APPARATUS, METHOD, AND NON-TRANSITORY COMPUTER READABLE STORAGE MEDIUM THEREOF

(71) Applicant: HTC Corporation, Taoyuan (TW)

(72) Inventors: Sheng-Jie Luo, Taoyuan (TW); Chi-Chiang Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 508 days.

(21) Appl. No.: 17/822,433

(22) Filed: Aug. 26, 2022

(65) Prior Publication Data

US 2024/0071138 A1 Feb. 29, 2024

(51) Int. Cl.
*G06V 40/20* (2022.01)
*G06T 13/40* (2011.01)

(52) U.S. Cl.
CPC .............. *G06V 40/20* (2022.01); *G06T 13/40* (2013.01)

(58) Field of Classification Search
None
See application file for complete search history.

(56) References Cited

U.S. PATENT DOCUMENTS

| | | | | |
|---|---|---|---|---|
| 6,377,281 B1* | 4/2002 | Rosenbluth | ........... | G06F 3/0481 345/473 |
| 6,941,239 B2* | 9/2005 | Unuma | .................... | A43B 3/34 340/8.1 |
| 7,859,540 B2* | 12/2010 | Dariush | .................. | G06T 7/251 345/475 |
| 8,390,628 B2* | 3/2013 | Harding | .................. | G06T 13/40 345/475 |
| 8,665,277 B1* | 3/2014 | Dykes | ..................... | G06T 15/06 463/32 |
| 11,439,904 B2* | 9/2022 | Stine | ...................... | A63F 13/837 |
| 11,978,142 B2* | 5/2024 | Kang | ...................... | G06F 40/30 |
| 12,172,075 B2* | 12/2024 | Stine | ....................... | A63F 13/53 |
| 12,200,320 B2* | 1/2025 | Yoshida | ............. | H04N 21/2402 |
| 12,223,725 B2* | 2/2025 | Liu | ........................ | G06V 40/20 |
| 2004/0027329 A1* | 2/2004 | Nakamura | .............. | G06T 13/40 345/156 |
| 2020/0064908 A1* | 2/2020 | Boucher | ................ | A63F 13/212 |
| 2021/0181857 A1 | 6/2021 | Marcolina et al. | | |
| 2022/0292752 A1* | 9/2022 | Kang | ..................... | G06T 13/40 |
| 2023/0028537 A1* | 1/2023 | Stine | ....................... | A63F 13/53 |

(Continued)

FOREIGN PATENT DOCUMENTS

| | | |
|---|---|---|
| CN | 112957736 A | 6/2021 |
| CN | 114210066 A | 3/2022 |
| TW | 202117499 A | 5/2021 |

OTHER PUBLICATIONS

Corresponding Taiwan office action issued on May 1, 2023.

*Primary Examiner* — Anand P Bhatnagar
(74) *Attorney, Agent, or Firm* — CKC & Partners Co., LLC (57) ABSTRACT

A computing apparatus, method, and non-transitory computer readable storage medium thereof are provided. The apparatus receives a plurality of character motion data of a plurality of virtual characters. The apparatus classifies the virtual characters based on the character motion data to generate a plurality of frame update groups, and each of the frame update groups corresponds to a motion calculation period. At each frame, the apparatus selects one of at least one subset of each of the frame update groups to calculate a motion synthesis for each of the virtual characters.

20 Claims, 6 Drawing Sheets

(56) References Cited

U.S. PATENT DOCUMENTS

2023/0162532 A1\* 5/2023 Ratha ................... G06V 40/23
  382/103
2023/0401274 A1\* 12/2023 Denninghoff ...... G06Q 30/0251

\* cited by examiner

COMPUTING APPARATUS, METHOD, AND NON-TRANSITORY COMPUTER READABLE STORAGE MEDIUM THEREOF

BACKGROUND

Field of Invention

The present invention relates to a computing apparatus, method, and non-transitory computer readable storage medium thereof. More particularly, the present invention relates to a computing apparatus, method, and non-transitory computer readable storage medium thereof for reducing a computation overhead of motion synthesis.

Description of Related Art

In recent years, various technologies related to virtual reality have developed rapidly, and various technologies and applications have been proposed one after another.

In the prior art, a user can enter a world of virtual reality (e.g., metaverse) with his/her virtual character through a device (e.g., a head-mounted display and a controller) to interact.

In such a case, in order to support a large number of users to enter the same virtual reality world, the device of the local user needs more computation overhead to calculate the motion of each virtual character in the virtual reality at each time point.

Basically, in order to make the movements of the virtual characters seen by the local user operate smoothly, the device of the local user needs to calculate the movements of each virtual character in each frame. However, since each virtual character needs to be calculated in each frame, the computational burden on the computing device is quite large, and the computational amount distributed in each frame may also be uneven. With the increasing number of virtual characters in the virtual world, it is difficult for low-end devices to provide instant interaction in the virtual world. Even a high-end computing device needs to spend a lot of computing time to calculate the actions of all the virtual characters, thus causing a bad experience for the user of the device.

Accordingly, there is an urgent need for a computing technology that can reduce a computation overhead of motion synthesis.

SUMMARY

An objective of the present disclosure is to provide a computing apparatus. The computing apparatus comprises a transceiver interface, a storage, and a processor, and the processor is electrically connected to the transceiver interface and the storage. The processor receives a plurality of character motion data of a plurality of virtual characters. The processor classifies the virtual characters based on the character motion data to generate a plurality of frame update groups, wherein each of the frame update groups corresponds to a motion calculation period. The processor selects one of at least one subset of each of the frame update groups at each frame to calculate a motion synthesis for each of the virtual characters.

Another objective of the present disclosure is to provide a computing method, which is adapted for use in an electronic apparatus. The computing method comprises following steps: determining a motion calculation period of each of a plurality of virtual characters based on a plurality of character motion data; classifying the virtual characters to generate a plurality of frame update groups, wherein each of the frame update groups corresponds to one of the motion calculation periods; and selecting one of at least one subset of each of the frame update groups at each frame to calculate a motion synthesis for each of the virtual characters.

A further objective of the present disclosure is to provide a non-transitory computer readable storage medium having a computer program stored therein. The computer program comprises a plurality of codes, the computer program executes a computing method after being loaded into an electronic computing apparatus. The computing method comprises following steps: determining a motion calculation period of each of a plurality of virtual characters based on a plurality of character motion data; classifying the virtual characters to generate a plurality of frame update groups, wherein each of the frame update groups corresponds to one of the motion calculation periods; and selecting one of at least one subset of each of the frame update groups at each frame to calculate a motion synthesis for each of the virtual characters.

According to the above descriptions, the computing technology (at least including the apparatus, the method, and the non-transitory computer readable storage medium) provided by the present disclosure pre-determines the motion calculation period of each of a plurality of virtual characters, and classifies the virtual characters to generate a plurality of frame update groups. Accordingly, when performing the calculation of each frame, only one of at least a subset of each of the frame update groups needs to be selected to calculate the motion synthesis of each of the virtual characters. The present disclosure allows each of the virtual characters to calculate motions at different motion calculation periods, and distributes the calculation amount evenly to different frames according to the importance of the virtual characters. Since the computing technology provided by the present disclosure can evenly distribute the calculation amount of each frame, and reduce the computation overhead of motion synthesis. Therefore, the disadvantage in the prior art that may cause a bad user experience of the apparatus is solved.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a computing apparatus, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
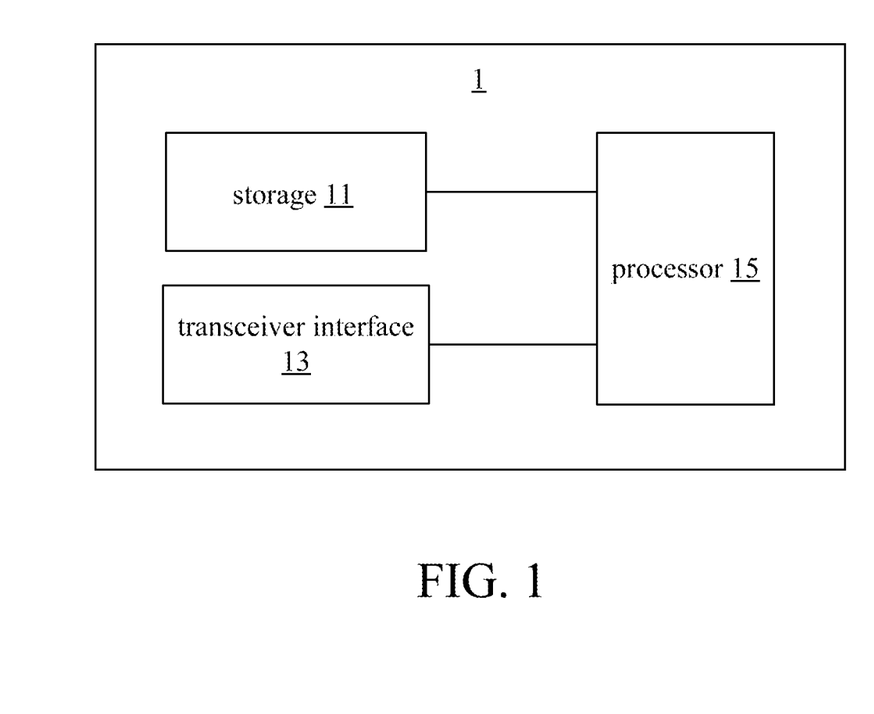
FIG. 1 is a schematic view depicting a computing apparatus of the first embodiment.

A first embodiment of the present invention is a computing apparatus 1 and a schematic view of which is depicted in FIG. 1. The computing apparatus 1 comprises a storage 11, a transceiver interface 13 and a processor 15, wherein the processor 15 is electrically connected to the storage 11 and the transceiver interface 13. The storage 11 may be a memory, a Universal Serial Bus (USB) disk, a hard disk, a Compact Disk (CD), a mobile disk, or any other storage medium or circuit known to those of ordinary skill in the art and having the same functionality. The transceiver interface 13 is an interface capable of receiving and transmitting data or other interfaces capable of receiving and transmitting data and known to those of ordinary skill in the art. The transceiver interface 13 can receive data from sources such as external apparatuses, external web pages, external applications, and so on. The processor 15 may be any of various processors, Central Processing Units (CPUs), microprocessors, digital signal processors or other computing apparatuses known to those of ordinary skill in the art.

It shall be appreciated that in the application environment of the present disclosure, the computing apparatus 1 can be applied to any environment that needs to calculate a motion synthesis of virtual characters. In some embodiments, the computing apparatus 1 can be integrated into, but not limited to, a wearable device (e.g., a smart bracelet), a head-mounted display, a mobile electronic device, or other electronic devices operated by a user, and so on.

For the convenience of description, the following will take the computing apparatus 1 installed in the head-mounted display as an example for description, but those with ordinary knowledge in the technical field to which this case belongs should be able to understand the operation method when the computing apparatus 1 is integrated with other devices according to the following description.

In the present disclosure, the local user can use the computing apparatus 1 integrated with the head-mounted display in a physical space (e.g., a room) to perform operations related to virtual reality. In addition, other users can operate their apparatuses in other physical spaces to enter the virtual world to control virtual characters.

In the present embodiment, the processor 15 in the computing apparatus 1 may receive a plurality of character motion data from a plurality of external apparatuses (e.g., apparatuses controlled by other users) through the transceiver interface 13 to calculate the motions of each virtual character in the virtual world. Specifically, the character motion data may comprise all necessary data for calculating the motion of the virtual character in the virtual world, such as movement data of the user's coordinates in the physical space, rotation coordinates, transformation parameters, and the like.

In some embodiments, each external apparatus may periodically transmit the character motion data to the computing apparatus 1 based on a predetermined period (e.g., a fixed frequency of 30 times per second).

Next, the processor 15 may allocate the virtual characters to a plurality of frame update groups. Specifically, the processor 15 may classify the virtual characters based on the character motion data to generate a plurality of frame update groups, wherein each of the frame update groups corresponds to a motion calculation period. For example, when the motion calculation period is 2 frames, it means that a motion of the virtual character needs to be calculated every two frames.

In some embodiments, the processor 15 may first determine the motion calculation period corresponding to each of the virtual characters (i.e., the motion of the virtual character needs to be updated every time after how many frames), and then classify based on the motion calculation period corresponding to each of the virtual characters. Specifically, the processor 15 may determine a motion calculation period corresponding to each of the virtual characters based on a plurality of factors and the character motion data. Next, the processor 15 classifies the virtual characters into the frame update groups based on the motion calculation period corresponding to each of the virtual characters.

In some embodiments, the processor 15 may determine the motion calculation period corresponding to each virtual character based on one or a combination of the following three factors: (i) a state of the virtual character, (ii) an action of a local user (i.e., the user corresponding to the computing apparatus), and (iii) a spatial relationship between the virtual character and the local user.

For example, the aforementioned three factors can be decomposed into the following rules:

Rule (1): The virtual character in the idle state does not need to calculate the motion synthesis. Therefore, the processor 15 may set the motion calculation period of the virtual character in the idle state to be infinite large (i.e., without calculating motion synthesis).

Rule (2): If the virtual character is a character of the local user, the motion calculation period may be set to 1 frame. That is, the motion synthesis needs to be calculated in each frame to ensure that the virtual character of the local user is always acts with smooth motion.

Rule (3): The virtual character located outside the local user's viewing frustum does not need to calculate the motion synthesis of the virtual character. Therefore, the processor 15 may set the motion calculation period of the virtual character outside the field of view of the local user to be infinite large (i.e., without calculating motion synthesis).

Rule (4): The moving speed of virtual character may affect the value of the motion calculation period (e.g., the moving of the character's hand and head). The processor 15 may determine, based on the preset speed threshold, that when the moving speed of the virtual character is relatively high, the virtual character is set as the active virtual character, and a lower motion calculation period frame should be set (i.e. updated more frequently). On the other hand, the processor 15 may determine, based on a preset speed threshold, that when the moving speed of the virtual character is relatively low, the virtual character is set as an inactive virtual character, and a higher motion calculation period should be set. In addition, the value of the motion calculation period can be set through the content described in the following rule (5).

Rule (5): For the virtual character inside the local user's viewing frustum, the processor 15 may determine the motion calculation period according to the distance between the virtual character and the local user. When the distance is small, the processor 15 may set a lower motion calculation period to ensure the smoothness of the motion of the virtual character. When the distance is larger, the processor 15 may set a larger motion calculation period to save the computation overhead of the virtual character while maintaining the smoothness of its motion. Furthermore, the value of the motion calculation period may vary according to the performance requirement of a software.

For example, the processor 15 may set the motion calculation period to the following values:
(a) When the distance is less than 5 meters, the processor 15 sets the motion calculation period of the active virtual character to 1 frame, and sets the motion calculation period of the inactive virtual character to 2 frames.
(b) When the distance is between 5 meters and 10 meters, the processor 15 sets the motion calculation period of the active virtual character to 2 frames, and sets the motion calculation period of the inactive virtual character to 4 frames.
(c) When the distance is between 10 meters and 15 meters, the processor 15 sets the motion calculation period of the active virtual character to 3 frames, and sets the motion calculation period of the inactive virtual character to 6 frames.
(d) When the distance is between 15 meters and 20 meters, the processor 15 sets the motion calculation period of the active virtual character to 5 frames, and sets the motion calculation period of the inactive virtual character to 10 frames.
(e) When the distance is greater than 20 meters, the processor 15 sets the motion calculation period of the active virtual character to 8 frames, and sets the motion calculation period of the inactive virtual character to 10 frames.

Rule (6): When the local user performs special actions that require all virtual characters to act correctly (e.g., taking picture or taking selfies in the virtual world), the processor 15 may set the motion calculation period of all virtual characters to a small positive integer to ensure that the postures of all virtual characters are updated in time (e.g., set the motion calculation period to 1 frame).

In some embodiments, the motion calculation periods corresponding to each of the frame update groups are different. In other words, each motion calculation period corresponds to only one frame update group.

In the present embodiment, if the motion calculation period corresponding to the frame update group is greater than 1, the processor 15 may divide each of the frame update groups into a plurality of subsets, and each of the subsets comprises a part of the virtual characters corresponding to the frame update group. In some embodiments, a quantity of the at least one subset comprised in each of the frame update groups is the same as the motion calculation period corresponding to each of the frame update groups. For example, when the motion calculation period corresponding to the frame update group is 3, the frame update group comprises 3 subsets.

In some embodiments, in order to average the computation overhead of the processor 15 when calculating the subsets comprised in each of the frame update groups, the processor 15 may evenly allocate the virtual characters to the subsets of the frame update groups. Specifically, the processor 15 allocates the virtual characters of each of the frame update groups evenly to the at least one subset of each of the frame update groups, and a difference in a quantity of the virtual characters comprised in each of the at least one subset comprised in each of the frame update groups is not greater than one.

Subsequently, at each frame, the processor 15 selects one of at least one subset of each of the frame update groups to calculate a motion synthesis for each of the virtual characters.

For example, the motion synthesis may be calculated based on an inverse kinematics (IK) algorithm.

In some embodiments, each of the at least one subset of each of the frame update groups is to be selected in turn in the frames of a same round corresponding to the motion calculation period, and each of the at least one subset is not recomputed in the frames of the same round (i.e., each of the subsets is calculated only once before reaching the next motion calculation period).

Figure 2:
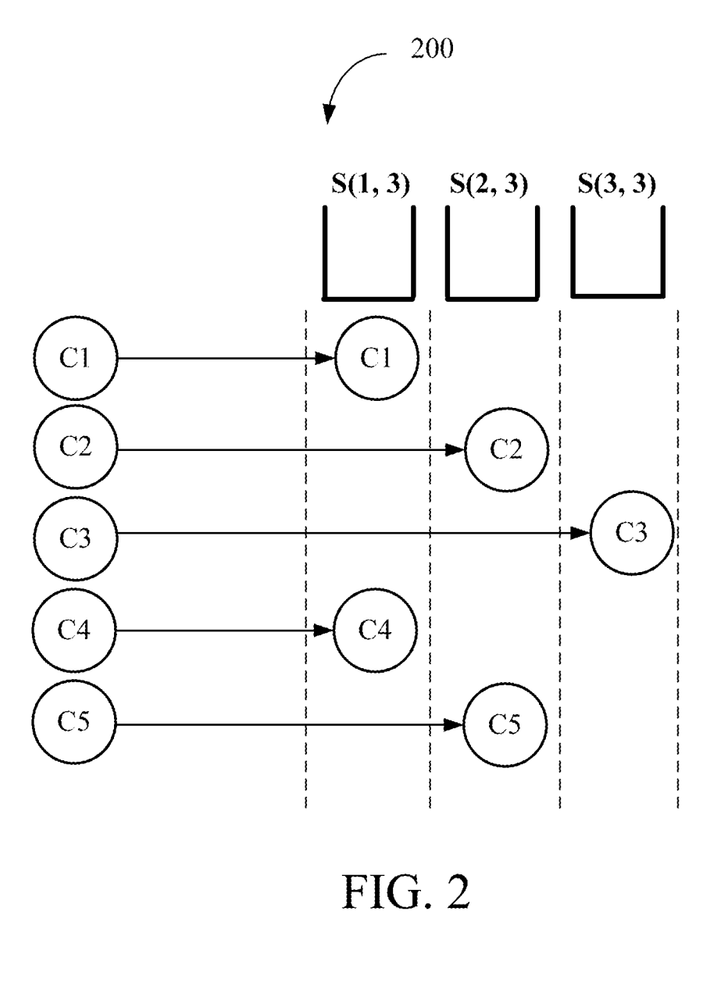
FIG. 2 is a schematic view depicting a frame update group and subsets of some embodiments.
Figure 3:
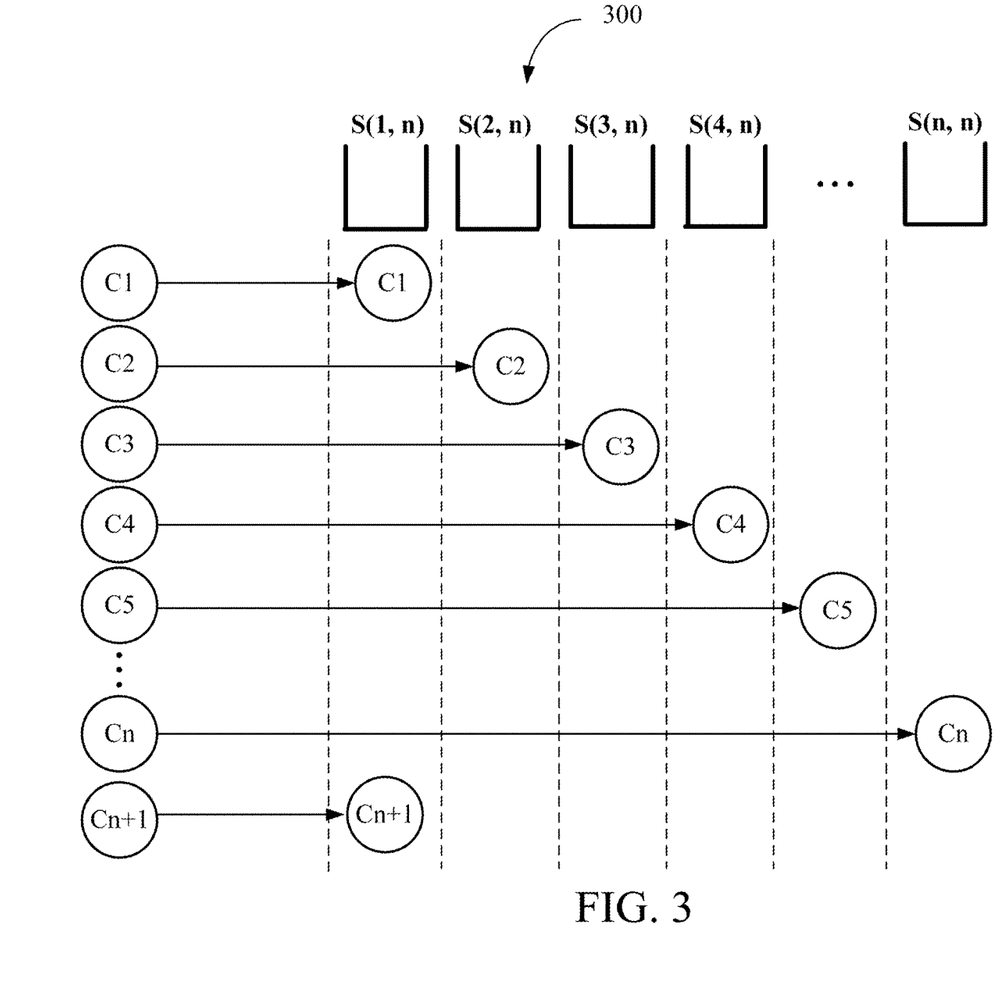
FIG. 3 is a schematic view depicting a frame update group and subsets of some embodiments.
Figure 4:
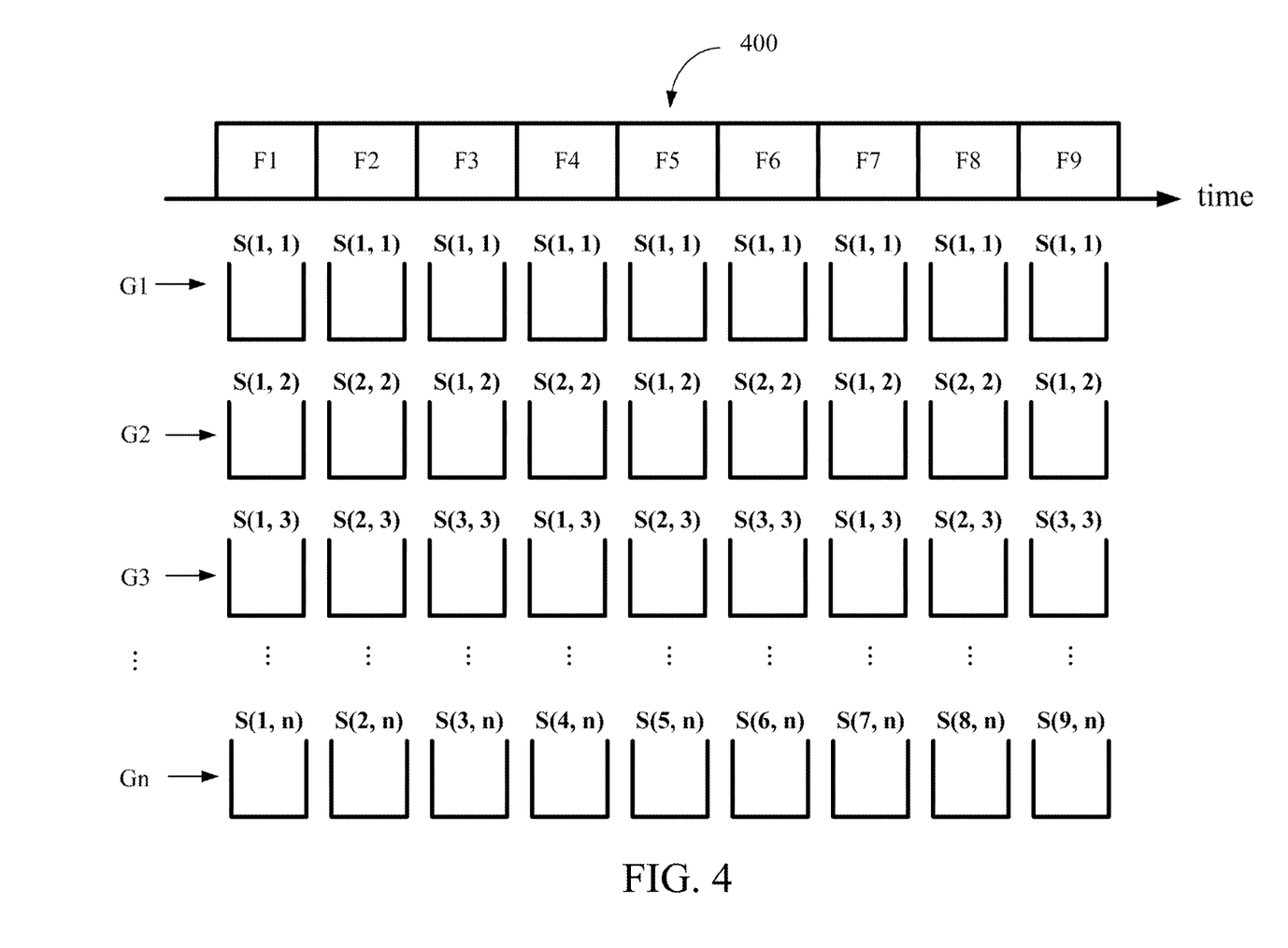
FIG. 4 is a schematic view depicting a operation of each frame of some embodiments.

For ease of understanding, an actual example is described, please refer to FIG. 2, FIG. 3, and FIG. 4. The schematic diagram 200 in FIG. 2 illustrates a frame update group with a motion calculation period of 3 frames and subsets thereof. In the present example, since the motion calculation period is 3 frames, the frame update group comprises three subsets S(1,3), S(2,3), and S(3,3).

In the present example, there are a plurality of virtual characters C1, C2, C3, C4, and C5 corresponding to the motion calculation period of 3 frames. First, at the beginning of the classification, since the three subsets S(1,3), S(2,3), and S(3,3) are all empty, the processor 15 may choose to allocate the virtual character C1 into any one of the subsets S(1,3), S(2,3), or S(3,3). In the present example, the processor 15 first allocates C1 into the subset S(1,3).

Next, since the number of the virtual characters currently in the subset S(1,3) is 1, and the number of the virtual characters in the subsets S(2,3) and S(3,3) is 0, the processor 15 may choose to allocate the virtual character C2 into any one of the subsets S(2,3) or S(3,3). In the present example, the processor 15 first allocates C2 into the subset S(2,3).

Subsequently, since the number of the virtual characters currently in the subsets S(1,3) and S(2,3) is 1, and the number of the virtual characters in the subset S(3,3) is 0. In the present example, in order to allocate the virtual characters to the subset with the smallest number of the virtual characters, the processor 15 allocates the virtual character C3 into the subset S(3,3). After executing the above method several times, finally, as shown in FIG. 2, the subset S(1,3) comprises the virtual characters C1 and C4, the subset S(2,3) comprises the virtual characters C2 and C5, and the set S(3,3) comprises the virtual character C3.

The schematic diagram 300 in FIG. 3 illustrates a frame update group with a motion calculation period of n frames and subsets thereof, where n is a positive integer. In the present example, there are a plurality of virtual characters C1, C2, C3, C4, C5, . . . , Cn, and Cn+1 corresponding to the motion calculation period of n frames. Since the motion calculation period is n frames, the frame update group comprises n subsets S(1,n), S(2,n), S(3,n), S(4,n), . . . , and S(n, n). In the same way as the foregoing allocation, the processor 15 sequentially allocates the virtual characters to the subset with the smallest number of the virtual characters. Finally, as shown in FIG. 3, the subset S(1,n) comprises the virtual characters C1 and Cn+1, the subset S(2,n) comprises the virtual character C2, the subset S(3,n) comprises the virtual character C3, the subset S(4,n) comprises the virtual character C4, . . . , the subset S(n,n) comprises the virtual character Cn, and so on.

Next, an example is given to illustrate the frame update group and its subsets that the processor 15 needs to calculate in each frame, please refer to FIG. 4. In FIG. 4, there are nine frames F1, F2, ..., F9 and n frame update groups G1, G2, ..., Gn (which correspond to motion calculation periods 1, 2, ... n, respectively).

As shown in FIG. 4, in the first frame F1, the processor 15 may calculate the motion synthesis for each of the virtual characters in the subset S(1,1) in the frame update group G1, the subset S(1, 2) in the frame update group G2, the subset S(1,3) in the frame update group G3, ... and the subset S(1,n) in the frame update group Gn. In the second frame F2, the processor 15 may calculate the motion synthesis for each of the virtual characters in the subset S(1,1) in the frame update group G1, the subset S(2,2) in the frame update group G2, the subset S(2,3) in the frame update group G3, ..., and the subset S(2,n) in the frame update group Gn. It shall be appreciated that the rest of frames F3, F4, ..., F9 also perform calculations in the same selection manner, so they are not repeated here.

Accordingly, for each frame update group, the processor 15 may calculate the motion synthesis for each of the virtual characters in the subset based on its motion calculation period, and since the difference in the number of virtual characters in each subset is not greater than one, the computational overhead required by the processor 15 may be evenly shared among each frame. Since the subsets in each frame update group are calculated in turn, each frame update group also conforms to its corresponding motion calculation period.

In some embodiments, the processor 15 may allocate the calculated motion synthesis to each frame through an interpolation algorithm, so as to make the presentation action smoother.

Specifically, the processor 15 performs the following operations for each of the virtual characters whose motion synthesis has been calculated: comparing a current motion with the motion synthesis of the virtual character to calculate a movement amount; and allocating the movement amount to a plurality of future frames based on an interpolation parameter and the movement amount to calculate a presentation action of the virtual character corresponding to each of the future frames. In some embodiments, the processor 15 evenly allocates the difference in character motion data to the future frames corresponding to the virtual character based on the interpolation parameter, and the interpolation parameter is related to the number of the future frames.

In some embodiments, the future frames correspond to the frames between a first time point and a second time point, and the first time point and the second time point are determined based on the motion calculation period of the virtual character.

Figure 5:
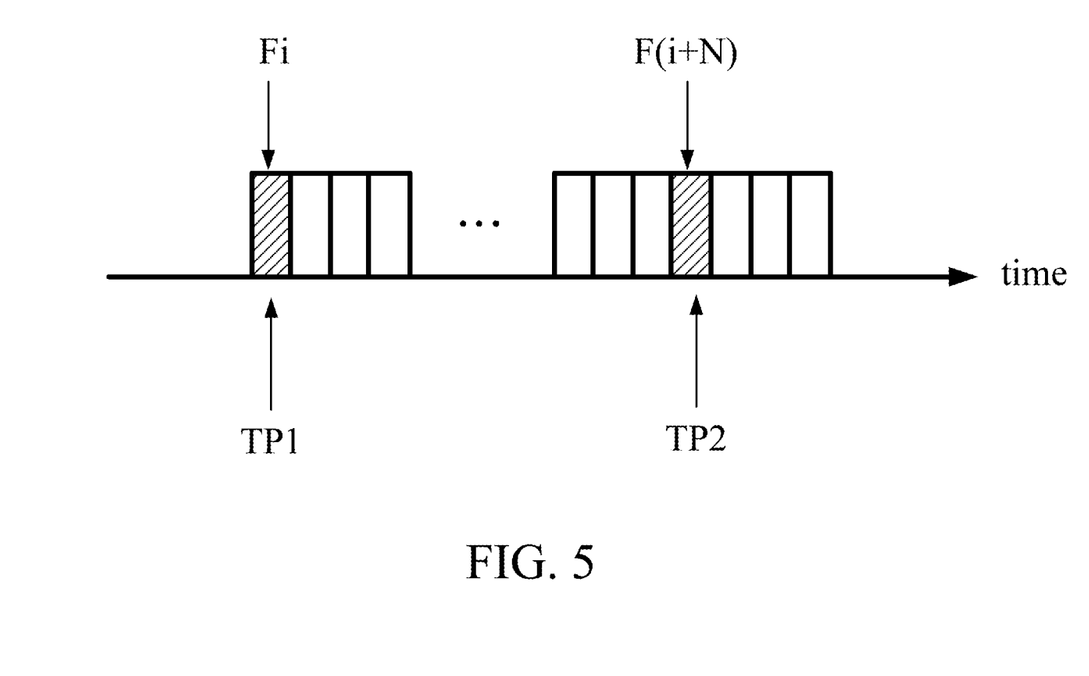
FIG. 5 is a schematic view depicting a interpolation operation in some embodiments.

For ease of understanding, an actual example is described, please refer to FIG. 5. FIG. 5 shows the implementation of the interpolation method when the motion calculation period is N frames. In the present example, the motion synthesis calculation is performed every N frames for the virtual character. At the i-th frame (i.e., the frame Fi), the motion synthesis is calculated for the first time, and the processor 15 obtains the result of the motion synthesis (e.g., the rotations of all bones to form character's posture) to form the posture of the virtual character at this moment (i.e., the target posture TP1).

Then, at the (i+N)-th frame (i.e., the frame F(i+N)), the motion synthesis is calculated for the second time, and the processor 15 obtains the result of the motion synthesis to form the posture of the virtual character at this moment (i.e., the target posture TP2). In the i-th frame and the (i+N)-th frame, in order to maintain the smoothness of the character movement, the processor 15 does not directly apply the obtained target postures TP1 and TP2 to the virtual character. On the contrary, the processor 15 keeps the posture of the virtual character unchanged at the i-th frame. Then for all (N−1) frames between the i-th frame and the (i+N)-th frame, the processor 15 uses the interpolation parameter w to adjust the character's motion synthesis from its current motion to the last calculated target posture (i.e., target posture TP1). In other words, the difference between the target posture TP1 calculated by the processor 15 and the current posture (i.e., the current motion) may be evenly distributed between the i-th frame and the (i+N−1)-th frame, and the target posture TP1 is presented at the (i+N)-th frame.

For example, the processor 15 may use the following formula to calculate the presentation action of each frame:

$$NCP=(1-w)*CP+w*TP$$

In the above formula, the symbol NCP represents the new virtual character posture (i.e., the presentation action of each frame). The parameter w represents the interpolation parameter, which is usually set between 0 and 1. The symbol CP is the current posture of the virtual character, and the symbol TP is the target posture of the virtual character (i.e., the motion synthesis of the virtual character after calculation).

According to the above descriptions, the computing apparatus 1 provided by the present disclosure pre-determines the motion calculation period of each of a plurality of virtual characters, and classifies the virtual characters to generate a plurality of frame update groups. Accordingly, when performing the calculation of each frame, only one of at least a subset of each of the frame update groups needs to be selected to calculate the motion synthesis of each of the virtual characters. The present disclosure allows each of the virtual characters to calculate motions at different motion calculation periods, and distributes the calculation amount evenly to different frames according to the importance of the virtual characters. Since the computing technology provided by the present disclosure can evenly distribute the calculation amount of each frame, and reduce the computation overhead of motion synthesis. Therefore, the disadvantage in the prior art that may cause a bad user experience of the apparatus is solved.

Figure 6:
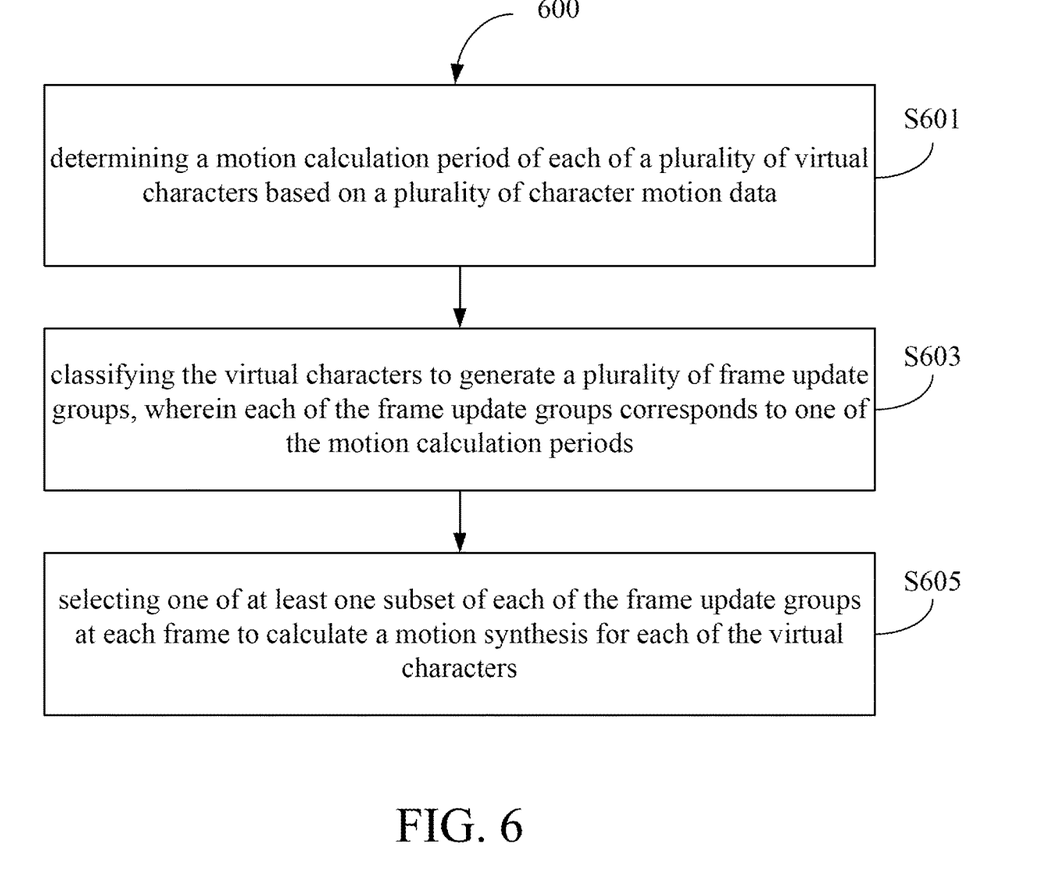
FIG. 6 is a partial flowchart depicting a computing method of the second embodiment.

A second embodiment of the present disclosure is a computing method and a flowchart thereof is depicted in FIG. 6. The computing method 600 is adapted for an electronic apparatus (e.g., the computing apparatus 1 of the first embodiment). The computing method 600 calculates a motion synthesis for each of the virtual characters through the steps S601 to S605.

In the step S601, the electronic apparatus determines a motion calculation period of each of a plurality of virtual characters based on a plurality of character motion data.

Next, in the step S603, the electronic apparatus classifies the virtual characters to generate a plurality of frame update groups, wherein each of the frame update groups corresponds to one of the motion calculation periods.

In some embodiments, the computing method 600 further comprises following steps: determining the motion calculation period corresponding to each of the virtual characters based on a plurality of factors and the character motion data; and classifying the virtual characters into the frame update groups based on the motion calculation period corresponding to each of the virtual characters.

In some embodiments, the factors comprise a state of the virtual character, an action of a local user, and a spatial relationship between the virtual character and the local user, or a combination thereof.

In some embodiments, the motion calculation periods corresponding to each of the frame update groups are different. In some embodiments, a quantity of the at least one subset comprised in each of the frame update groups is the same as the motion calculation period corresponding to each of the frame update groups.

In some embodiments, each of the at least one subset of each of the frame update groups is to be selected in turn in the frames of a same round corresponding to the motion calculation period (i.e., in the frames of the same motion calculation period before the next motion calculation period), and each of the at least one subset is not recomputed in the frames of the same round. For example, the subsets may be selected in a fixed order by their numbering.

In some embodiments, the computing method 600 further comprises following steps: allocating the virtual characters of each of the frame update groups evenly to the at least one subset of each of the frame update groups; wherein a difference in a quantity of the virtual characters comprised in each of the at least one subset comprised in each of the frame update groups is not greater than one.

Finally, in the step S605, the electronic apparatus selects one of at least one subset of each of the frame update groups at each frame to calculate a motion synthesis for each of the virtual characters.

In some embodiments, the motion synthesis is calculated based on an inverse kinematics algorithm.

In some embodiments, the computing method 600 further comprises following steps: performing following steps for each of the virtual characters whose motion synthesis has been calculated: comparing a current motion with the motion synthesis of the virtual character to calculate a movement amount; and allocating the movement amount to a plurality of future frames based on an interpolation parameter and the movement amount to calculate a presentation action of the virtual character corresponding to each of the future frames.

In addition to the aforesaid steps, the second embodiment can also execute all the operations and steps of the computing apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The computing method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the computing apparatus 1), the computer program executes the computing method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

According to the above descriptions, the computing technology (at least including the apparatus, the method, and the non-transitory computer readable storage medium) provided by the present disclosure pre-determines the motion calculation period of each of a plurality of virtual characters, and classifies the virtual characters to generate a plurality of frame update groups. Accordingly, when performing the calculation of each frame, only one of at least a subset of each of the frame update groups needs to be selected to calculate the motion synthesis of each of the virtual characters. The present disclosure allows each of the virtual characters to calculate motions at different motion calculation periods, and distributes the calculation amount evenly to different frames according to the importance of the virtual characters. Since the computing technology provided by the present disclosure can evenly distribute the calculation amount of each frame, and reduce the computation overhead of motion synthesis. Therefore, the disadvantage in the prior art that may cause a bad user experience of the apparatus is solved.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computing apparatus, comprising:
a transceiver interface;
a storage; and
a processor, being electrically connected to the transceiver interface and the storage, and being configured to perform operations comprising:
receiving a plurality of character motion data of a plurality of virtual characters;
classifying the virtual characters based on the character motion data to generate a plurality of frame update groups, wherein each of the frame update groups corresponds to a motion calculation period; and
selecting one of at least one subset of each of the frame update groups at each frame to calculate a motion synthesis for each of the virtual characters.

2. The computing apparatus of claim 1, wherein the motion calculation periods corresponding to each of the frame update groups are different.

3. The computing apparatus of claim 1, wherein a quantity of the at least one subset comprised in each of the frame update groups is the same as the motion calculation period corresponding to each of the frame update groups.

4. The computing apparatus of claim 1, wherein each of the at least one subset of each of the frame update groups is to be selected in turn in the frames of a same round corresponding to the motion calculation period, and each of the at least one subset is not recomputed in the frames of the same round.

5. The computing apparatus of claim 1, wherein the processor is further configured to perform following operations:
- allocating the virtual characters of each of the frame update groups evenly to the at least one subset of each of the frame update groups;
- wherein a difference in a quantity of the virtual characters comprised in each of the at least one subset comprised in each of the frame update groups is not greater than one.

6. The computing apparatus of claim 1, wherein the motion synthesis is calculated based on an inverse kinematics algorithm.

7. The computing apparatus of claim 1, wherein the processor is further configured to perform following operations:
- determining the motion calculation period corresponding to each of the virtual characters based on a plurality of factors and the character motion data; and
- classifying the virtual characters into the frame update groups based on the motion calculation period corresponding to each of the virtual characters.

8. The computing apparatus of claim 7, wherein the factors comprise a state of the virtual character, an action of a local user, and a spatial relationship between the virtual character and the local user, or a combination thereof.

9. The computing apparatus of claim 1, wherein the processor is further configured to perform following operations:
- performing following operations for each of the virtual characters whose motion synthesis has been calculated:
  - comparing a current motion with the motion synthesis of the virtual character to calculate a movement amount; and
  - allocating the movement amount to a plurality of future frames based on an interpolation parameter and the movement amount to calculate a presentation action of the virtual character corresponding to each of the future frames.

10. The computing apparatus of claim 9, wherein the future frames correspond to the frames between a first time point and a second time point, and the first time point and the second time point are determined based on the motion calculation period of the virtual character.

11. A computing method, being adapted for use in an electronic apparatus, and the computing method comprises:
- determining a motion calculation period of each of a plurality of virtual characters based on a plurality of character motion data;
- classifying the virtual characters to generate a plurality of frame update groups, wherein each of the frame update groups corresponds to one of the motion calculation periods; and
- selecting one of at least one subset of each of the frame update groups at each frame to calculate a motion synthesis for each of the virtual characters.

12. The computing method of claim 11, wherein the motion calculation periods corresponding to each of the frame update groups are different.

13. The computing method of claim 11, wherein a quantity of the at least one subset comprised in each of the frame update groups is the same as the motion calculation period corresponding to each of the frame update groups.

14. The computing method of claim 11, wherein each of the at least one subset of each of the frame update groups is to be selected in turn in the frames of a same round corresponding to the motion calculation period, and each of the at least one subset is not recomputed in the frames of the same round.

15. The computing method of claim 11, wherein the computing method further comprises following steps:
- allocating the virtual characters of each of the frame update groups evenly to the at least one subset of each of the frame update groups;
- wherein a difference in a quantity of the virtual characters comprised in each of the at least one subset comprised in each of the frame update groups is not greater than one.

16. The computing method of claim 11, wherein the motion synthesis is calculated based on an inverse kinematics algorithm.

17. The computing method of claim 11, wherein the computing method further comprises following steps:
- determining the motion calculation period corresponding to each of the virtual characters based on a plurality of factors and the character motion data; and
- classifying the virtual characters into the frame update groups based on the motion calculation period corresponding to each of the virtual characters.

18. The computing method of claim 17, wherein the factors comprise a state of the virtual character, an action of a local user, and a spatial relationship between the virtual character and the local user, or a combination thereof.

19. The computing method of claim 11, wherein the computing method further comprises following steps:
- performing following steps for each of the virtual characters whose motion synthesis has been calculated:
  - comparing a current motion with the motion synthesis of the virtual character to calculate a movement amount; and
  - allocating the movement amount to a plurality of future frames based on an interpolation parameter and the movement amount to calculate a presentation action of the virtual character corresponding to each of the future frames.

20. A non-transitory computer readable storage medium, having a computer program stored therein, wherein the computer program comprises a plurality of codes, the computer program executes a computing method after being loaded into an electronic computing apparatus, the computing method comprises:
- determining a motion calculation period of each of a plurality of virtual characters based on a plurality of character motion data;
- classifying the virtual characters to generate a plurality of frame update groups, wherein each of the frame update groups corresponds to one of the motion calculation periods; and
- selecting one of at least one subset of each of the frame update groups at each frame to calculate a motion synthesis for each of the virtual characters.

* * * * *